(12) United States Patent
Toyoda

(10) Patent No.: US 7,497,125 B2
(45) Date of Patent: Mar. 3, 2009

(54) PRESSURE SENSOR WITH DIAPHRAGM FOR DETECTING PRESSURE

(75) Inventor: Inao Toyoda, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/826,844

(22) Filed: Jul. 19, 2007

(65) Prior Publication Data

US 2008/0060441 A1    Mar. 13, 2008

(30) Foreign Application Priority Data

Sep. 13, 2006    (JP) .............................. 2006-247949

(51) Int. Cl.
*G01L 7/08*    (2006.01)
(52) U.S. Cl. .......................................... 73/715; 73/714
(58) Field of Classification Search .................. 73/715, 73/714
See application file for complete search history.

(56) References Cited

U.S. PATENT DOCUMENTS 5,471,883 A    12/1995  Glaser 6,240,777 B1 *  6/2001  Treutler et al. ........... 73/204.26
6,843,132 B2    1/2005  Mizuno et al.

FOREIGN PATENT DOCUMENTS

| JP | UM-S-56-041231 | | 4/1981 |
| JP | 02253133 A | * | 10/1990 |
| JP | A-2005-291740 | | 10/2005 |
| JP | A-2006-194736 | | 7/2006 |

* cited by examiner

*Primary Examiner*—Andre J Allen
(74) *Attorney, Agent, or Firm*—Posz Law Group, PLLC

(57) ABSTRACT

A pressure sensor has a diaphragm with a first layer and a second layer, a pressure transmitting member being in contact with the second layer, and a sensing element. The diaphragm is deformable in response to a pressure applied on a front surface of the first layer. The transmitting member transmits this pressure to the sensing element. The sensing element detects the pressure. A heat applied to the diaphragm induces the layers to be shifted toward the transmitting member or the opposite side of the transmitting member due to a shape of the diaphragm. The layers of the diaphragm have thermal expansion coefficients differing from each other. A thermal deformation of the layers caused by the thermal expansion difference between the layers cancels out the thermal deformation of the layers originated in the shape of the diaphragm.

18 Claims, 3 Drawing Sheets

PRESSURE SENSOR WITH DIAPHRAGM FOR DETECTING PRESSURE

CROSS-REFERENCE TO RELATED APPLICATION

This application is based upon and claims the benefit of priority of the prior Japanese Patent Application 2006-247949 filed on Sep. 13, 2006 so that the contents of which are incorporated herein by reference.

BACKGROUND OF THE INVENTION

1. Field of the Invention

The present invention generally relates to a pressure sensor for measuring a pressure applied on a diaphragm thereof, and more particularly to a pressure sensor for detecting a combustion pressure of a combustion gas changing in a combustion chamber of an internal combustion engine.

2. Description of Related Art

A pressure sensor has been mounted on a vehicle to measure a combustion pressure of a combustion gas in a combustion chamber of an internal combustion engine. This sensor has a case, a pressure receiving diaphragm fixed to the case on one end side of the case, a pressure transmitting member attached to the diaphragm in the case, and a pressure detecting unit disposed on the other end side of the case. The detecting unit has a bridge circuit composed of a plurality of deformation gauges. The diaphragm has a pressure receiving surface exposed to the gas of the chamber. When a combustion pressure of the gas is applied to the surface of the diaphragm, the diaphragm is deformed and adds a load corresponding to the pressure to the pressure transmitting member. The member transmits this load to the pressure detecting unit, and the unit converts the load into an electric signal indicating a level of the pressure. Therefore, the sensor can detect the combustion pressure.

In this sensor, the gas reaches a high temperature such as 1000° C. or more when being exploded in the chamber, so that a thermal stress is caused in the diaphragm due to the heat of the gas. The diaphragm is deformed due to this stress so as to add a load to the pressure transmitting member. Therefore, the diaphragm cannot correctly add a load corresponding to the pressure to the member, so that the sensor cannot correctly detect the pressure. To solve this problem, Published Japanese Patent First Publication No. 2004-347387 has disclosed a pressure sensor wherein a diaphragm has a pressure receiving surface formed in a specific shape so as to reduce adverse influence of the heat of the gas on the diaphragm. Therefore, deformation of the surface caused by the heat of the gas can be reduced in some degree.

However, an engine speed and/or a required engine torque or load frequently vary with time, so that combustion conditions of the gas such as a combustion pressure, a combustion temperature and the like are frequently changed. In this case, influence of the thermal stress on the diaphragm is variously changed in response to the combustion conditions. When the combustion conditions are variously or frequently changed, the sensor merely formed in a specific shape cannot correctly detect the pressure.

Further, U.S. Pat. No. 5,471,883 has disclosed a pressure sensor wherein a cooling system is disposed to cool an inner surface of the diaphragm with water. In this sensor, because the temperature of the diaphragm is almost adjusted within a predetermined range, the influence of the thermal stress on the diaphragm can be considerably reduced. However, because the cooling system is additionally disposed in the sensor, a size of the sensor becomes large, and a manufacturing cost of the sensor becomes heightened.

SUMMARY OF THE INVENTION

An object of the present invention is to provide, with due consideration to the drawbacks of the conventional pressure sensor, a pressure sensor which is made in a small size at a low cost and correctly detects a combustion pressure in a chamber even when combustion conditions in the chamber are variously changed.

According to a first aspect of this invention, the object is achieved by the provision of a pressure sensor comprising a diaphragm with a first layer and a second layer deformable in response to a pressure applied on a front surface of the first layer, a pressure transmitting member receiving the pressure from the second layer of the diaphragm in response to a deformation of the diaphragm, and a sensing element detecting the pressure transmitted from the pressure transmitting member. A thermal expansion coefficient of the first layer differs from a thermal expansion coefficient of the second layer.

With this structure of the sensor, when the diaphragm are deformed in response to a pressure, the pressure transmitting member receives the pressure from the diaphragm and transmits the pressure to the sensing element, and the element detects the pressure.

Further, because the thermal expansion coefficients of the first and second layers differ from each other, a combination of the layers acts as a bimetallic element. In this case, although a heat added to the diaphragm induces the diaphragm to be deformed and shifted due to a shape of the diaphragm toward a direction approaching or going away from the pressure transmitting member, the combination of the layers acting as a bimetallic element induces the diaphragm not to be deformed. Therefore, even when a heat is added to the diaphragm, a thermal deformation of the first and second layers caused by a difference in thermal expansion between the layers can cancel out a thermal deformation of the diaphragm originated in a shape of the layers. In other words, the difference in thermal expansion between the layers can prevent the diaphragm from being shifted toward the pressure transmitting member or the opposite side of the pressure transmitting member due to a thermal deformation of the diaphragm originated in a shape of the layers.

Accordingly, a downsized pressure sensor can be made at a low cost. Further, the sensor can correctly detect a combustion pressure in a chamber even when combustion conditions in the chamber are variously changed.

According to a second aspect of this invention, the object is achieved by the provision of a pressure sensor comprising a diaphragm with first and second layers being deformable in response to a pressure applied on a front surface of the first layer, a deformation transmitting member being in contact with the second layer of the diaphragm, and a sensing element receiving a deformation of the diaphragm through the deformation transmitting member and detecting the pressure from the deformation. The first and second layers have thermal expansion coefficients differing from each other so as to reduce a thermal deformation of the diaphragm originating in a shape of the diaphragm.

With this structure of the sensor, when the first and second layers of the diaphragm are deformed in response to a pressure, the deformation transmitting member transmits a deformation of the diaphragm to the sensing element. The element detects the pressure from the deformation.

Further, although a heat added to the diaphragm induces a thermal deformation of the diaphragm originating in a shape of the diaphragm, a combination of the layers acts as a bimetallic element due to the difference in the thermal expansion between the layers so as to reduce the thermal deformation of the diaphragm. Therefore, even when a heat is added to the diaphragm, a thermal deformation of the diaphragm toward the deformation transmitting member or the opposite side of the deformation transmitting member can be suppressed. Accordingly, the pressure sensor can be downsized and made at a low cost. Further, the sensor can correctly detect a combustion pressure in a chamber even when combustion conditions in the chamber are variously changed.

DETAILED DESCRIPTION OF THE PREFERRED EMBODIMENTS

Figure 1:
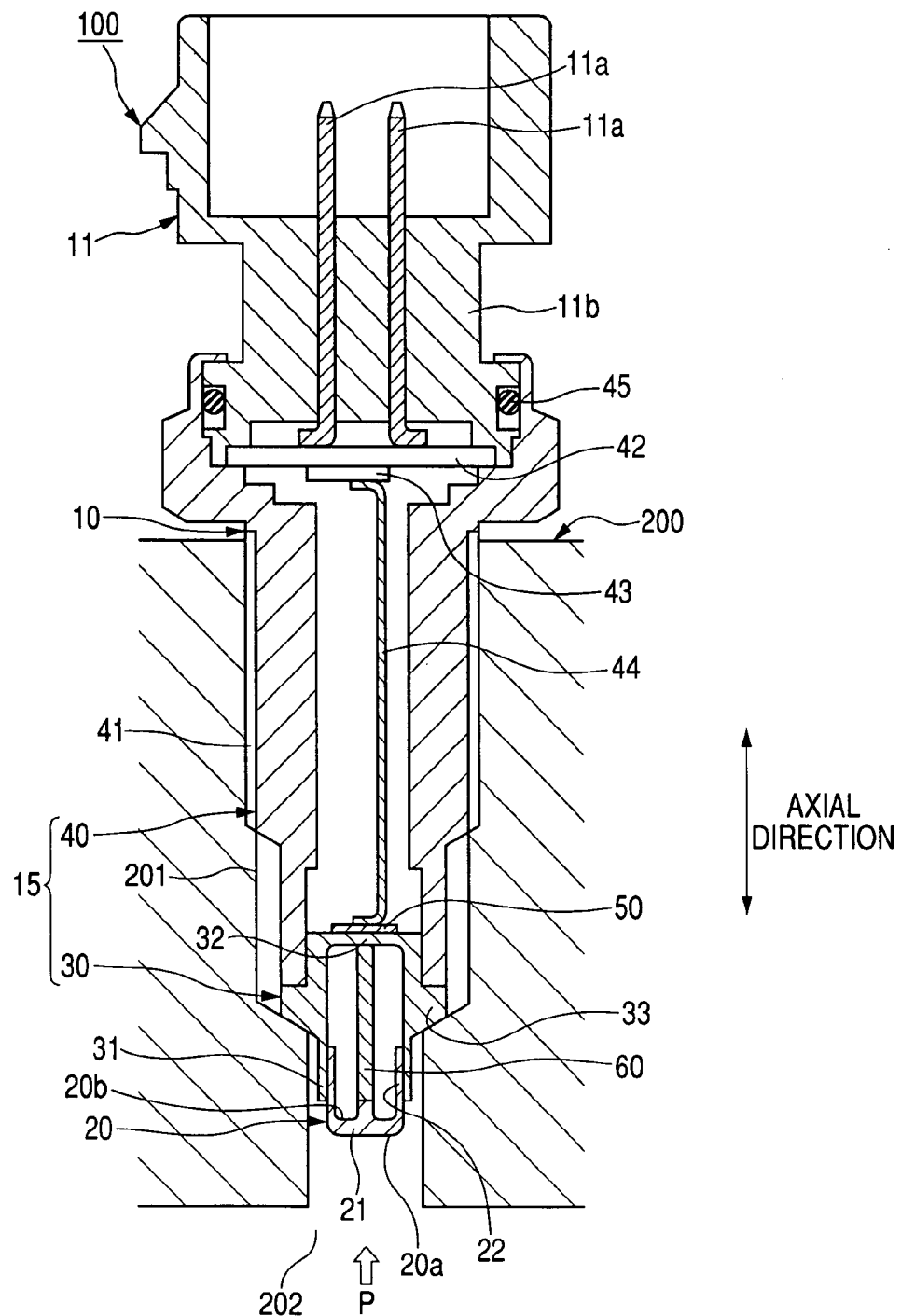
FIG. 1 is a sectional view schematically showing a pressure sensor according to a first embodiment of the present invention.

Embodiments of the present invention will now be described with reference to the accompanying drawings, in which like reference numerals indicate like parts, members or elements throughout the specification unless otherwise indicated.

Embodiment 1

FIG. 1 is a sectional view schematically showing a pressure sensor according to a first embodiment of the present invention.

A pressure sensor 100 shown in FIG. 1 is attached to a combustion chamber 202 of an internal combustion engine 200. Therefore, the sensor 100 is applied as a combustion pressure sensor for detecting a combustion pressure P of a combustion gas in the chamber 202. As shown in FIG. 1, the sensor 100 has a cylindrical case portion 10 and a connector portion 11 attached to the case portion 10. In the engine 200, an attaching hole 201 is disposed to extend from an outer surface of the engine 200 to the chamber 202. The case portion 10 is inserted into the hole 201 such that a distal portion of the case portion 10 faces the chamber 202, and a proximal portion of the case portion 10 closes the hole 201 on the outer surface of the engine 200.

The case portion 10 has a base portion 15 and a pressure receiving diaphragm 20 attached to the base portion 15 along an axial direction of the case portion 10. The base portion has a cylindrical housing 40 made of stainless steel and a cylindrical stem 30 made of stainless steel. The housing 40, the stem 30 and the diaphragm 20 are attached to one another in that order by welding, brazing, adhesion or the like so as to form one united body. The diaphragm is exposed to the combustion gas of the chamber 202. The case portion 10 further has a pressure transmitting member (or a deformation transmitting member) 60 formed in a bar shape so as to extend along the axial direction in an open space surrounded by the diaphragm 20 and the stem 30.

The housing 40 has a screw portion 41 on its outer surface as an attaching portion. The housing 40 is screwed into the hole 201 formed as a tapped hole such that the screw portion 41 engages with a wall of the tapped hole 201, so that the housing 40 is fixedly attached to the engine 200.

The stem 30 has a ring-shaped opened portion 31 attached to the diaphragm 20, a cup-shaped thinned-wall deformable portion 32 closing a distal end opening of the housing 40, and a tapered sealing portion 33 disposed between the portions 31 and 32. The portion 33 is formed so as to be protruded from the outer circumferential surfaces of the portions 31 and 32 along a radial direction of the stem 30 and is in contact with a tapered seat of the engine 200 protruded into the hole 201. When the sensor 100 is attached to the engine 200 by the screw coupling, the sealing portion 33 is tightly attached to the inner wall of the hole 201 when the sensor 100 is screw-coupled with the engine 200 while adding an attaching force to the wall of the hole 201. Therefore, the chamber 202 is sealed from the outside by the sealing portion 33.

The diaphragm 20 has a flat bottom portion 21 and a ring-shaped end portion 22 surrounding the portion 21 so as to be simply formed in a cup shape. The portion 22 is fixedly attached to the inner circumferential wall of the portion 31 of the stem 30. The portion 21 has a flat front surface 20a and a rear surface 20b opposite to each other along the axial direction. The surface 20a extends on a plane substantially perpendicular to the axial direction and is exposed to the combustion gas of the chamber 202. A pressure P of the gas is applied on the surface 20a. The portion 21 is deformable to be shifted toward the member 60 in response to the pressure P.

The member 60 is made of either a metallic material such as stainless steel or a ceramic material. One end of the member 60 is in contact with the rear surface 20b of the diaphragm 20 so as to push the diaphragm 20, and another end of the member 60 is in contact with a front surface of the deformable portion 32 of the stem 30 so as to push the portion 32. The member 60 transmits the pressure P received in the diaphragm 20 or deformation of the diaphragm 20 to the deformable portion 32, and the portion 32 is deformed in response to this pressure P or deformation.

The case portion 10 further has a sensing element 50 disposed on a rear surface of the deformable portion 32 of the stem 30 so as to be attached to the portion 32 through a glass layer (not shown) having a low melting point. The sensing element 50 has a bridge circuit disposed on a semiconductor chip. The bridge circuit is composed of a plurality of deformation gauges, and each deformation gauge is formed of a diffused resistor disposed on the semiconductor chip. The sensing element 50 is deformed in response to the deformation of the portion 32 and produces an electric signal indicating a level of the pressure P.

Further, in a center space of the housing 40, the case portion 10 has a distributing board 42 formed of a ceramic plate, an integrated circuit (IC) chip 43 disposed on the board 42, and a wiring member 44 electrically connecting the chip 43 and the sensing element 50. The member 44 is formed of a lead wire or a flexible printed wiring. The chip 43 is electrically connected with the board 42 through a plurality of bonding wires (not shown). The chip 43 has an amplifying circuit (not shown) for amplifying and adjusting an amplitude of the electric signal received from the sensing element 50 through the wiring member 44.

The connector portion 11 has a connector base 11b made of resin and a plurality of metallic terminals 11a inserted into the base 11b. The base 11b is fixedly attached to the housing 40 through an O-ring 45 by caulking or the like. The terminals 11a are fixed to the base 11b. Each terminal 11a is electrically connected with the board 42. Each terminal 11a is electrically connectable with an electronic control unit (ECU) of the vehicle so as to transmit information of the pressure P to the ECU.

With this structure of the sensor 100, when the diaphragm 20 is deformed and shifted toward the member 60 in response to the pressure P, the member 60 transmits this pressure P or a deformation of the diaphragm 20 to the stem 30. In response to the pressure P or deformation, the portion 32 of the stem 30 is deformed. In response to the deformation of the stem 30, the sensing element 50 is deformed and generates an electric signal indicating the pressure P. This signal is transmitted to the chip 43 through the member 44, and the chip 43 appropriately amplifies and adjusts the signal. This adjusted signal is distributed to a plurality of ECUs through the board 42 and terminals 11a. Therefore, each ECU can control one actuator or more according to the detected pressure P to appropriately operate the engine 200.

Figure 2:
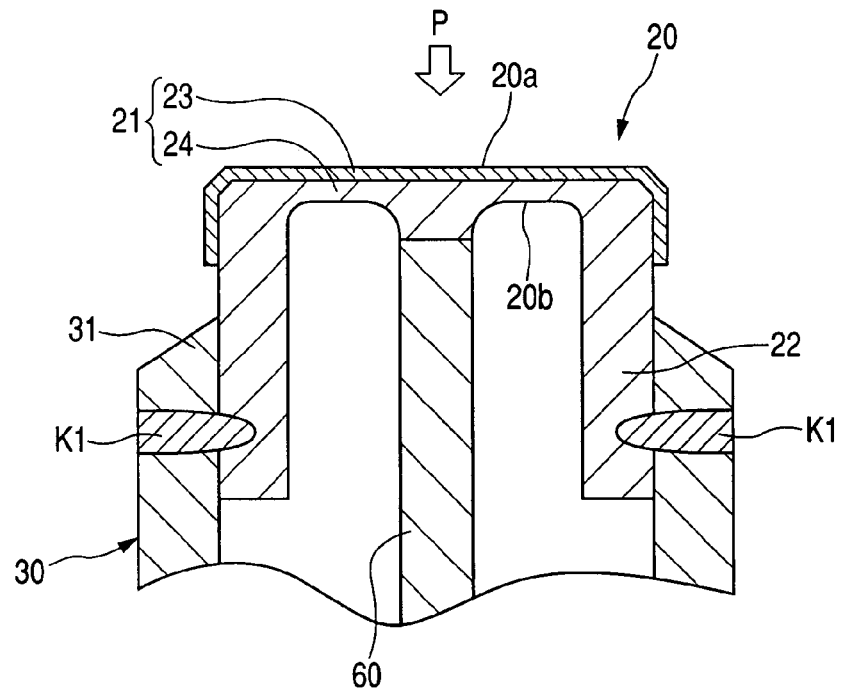
FIG. 2 is an enlarged view of a diaphragm of the pressure sensor shown in FIG. 1.

Next, the diaphragm 20 is described in detail below. FIG. 2 is an enlarged view of the diaphragm 20 attached to the stem 30 according to a first embodiment.

As shown in FIG. 2, the diaphragm 20 has a lamination of both a first layer 23 with the surface 20a and a second layer 24 with the surface 20b. The layers 23 and 24 are attached to each other by rolling. That is, two metallic plates stacked up are simultaneously rolled by a rolling mill to form the layers 23 and 24.

The diaphragm 20 is formed in a cup shape by bending end portions of two disk-shaped metallic plates attached to each other. The bottom portion 21 of the diaphragm 20 is formed of a lamination of the layers 23 and 24 and forms a bottom wall of the diaphragm 20. Ends portions of the first and second layers 23 and 24 form a side wall of the diaphragm 20. The most end portion of the second layer 24 forms the portion 22. The member 60 is attached to the second layer 24 of the bottom portion 21 at almost the center of the second layer 24. The portion 22 and the stem 30 are fixed to each other by laser welding performed for the portion 22 and stem 30 along the circumferential direction of the stem 30. Therefore, the end portion 22 and the stem 30 are fixed to each other in a fixing area K1.

The diaphragm 20 is shaped so as to protrude the bottom portion 21 from the fixing area K1 toward an opposite side of the member 60. Therefore, the first layer 23 becomes an outer layer of the diaphragm 20, and the second layer 24 becomes an inner layer of the diaphragm 20. In this shape of the diaphragm 20, when the diaphragm 20 receives a heat from the gas, the heat induces the bottom portion 21 to be deformed and shifted toward the opposite side of the member 60.

Further, the first layer 23 is made of a material having a coefficient $\alpha 1$ of linear thermal expansion (or volume thermal expansion), and the second layer 24 is made of a material having a coefficient $\alpha 2$ of linear thermal expansion (or volume thermal expansion) larger than the coefficient $\alpha 1$ ($\alpha 1 < \alpha 2$). For example, the second layer 24 is made of 18-8 austenite stainless steel (or SUS304 prescribed by Japan Industrial Standards (JIS)) containing 0.08 wt % Carbon or less, 1.00 wt % Silicon or less, 2.00 wt % Manganese or less, 0.045 wt % Phosphorus or less, 0.030 wt % Sulfur or less, 8.00 wt % to 10.50 wt % Nickel, 18.00 wt % to 20.00 wt % Chromium, and the balance substantially all iron. The first layer 23 is made of a SUS630 (prescribed by JIS) type stainless steel, a SUS631 (prescribed by JIS) type stainless steel, a SUS430 (prescribed by JIS) type stainless steel, Koval, Invar, 42-Alloy, or Molybdenum. The SUS630 contains 17 wt % Chromium, 4 wt % Nickel, 4 wt % Copper, Niobium slightly, and the balance substantially all iron. The SUS631 contains 17 wt % Chromium, 7 wt % Nickel, 1 wt % Aluminum, and the balance substantially all iron. The SUS430 contains 18 wt % Chromium and the balance substantially all iron. Koval contains 29 wt % Nickel, 17 wt % Cobalt, and the balance substantially all iron. Invar contains 36 wt % Nickel and the balance substantially all iron. 42-Alloy contains 42% Nickel and the balance substantially all iron.

With this structure of the diaphragm 20, even when the diaphragm 20 is heated by the gas at a high temperature around 1000° C., a thermal deformation of the diaphragm 20 originated in the shape of the diaphragm 20 is suppressed due to a difference in thermal expansion between the first and second layers 23 and 24.

Assuming that a diaphragm having the same shape as the diaphragm 20 and being made of a single material is thermally expanded, the diaphragm does not expand along extending directions of a gas receiving surface of the diaphragm (or directions perpendicular to the axial direction). That is, because the bottom portion of the diaphragm is protruded from the fixing area K1 toward the opposite side of the member 60 (or upper direction in FIG. 2), the bottom portion is deformed so as to go away from the area K1 and the member 60. Therefore, the diaphragm induces the member 60 attached to the diaphragm to go away from the portion 32 of the stem 30. That is, the diaphragm 20 has a first function of shifting the bottom portion 21 toward the opposite side of the member 60 in the thermal deformation originated in the shape of the diaphragm 20.

In contrast, in this embodiment, the diaphragm 20 is formed of a lamination of the first and second layers 23 and 24, and the thermal expansion coefficient of the first layer 23 with the surface 20a is set to be smaller than that of the second layer 24 attached to the member 60. Therefore, the diaphragm 20 also has a second function of shifting the bottom portion 21 toward the member 60 in the thermal deformation caused by a difference in thermal expansion coefficient between the first and second layers 23 and 24. More specifically, a thermal expansion coefficient of the second layer 24 is larger than that of the first layer 23. When a heat of the combustion gas is applied to the diaphragm 20, a combination of the layers 23 and 24 acts as a bimetallic element and induces the bottom portion 21 to be deformed and shifted toward the member 60.

Therefore, because the first and second functions of the diaphragm 20 can cancel out each other, the thermal deformation of the diaphragm 20 originated in the shape of the diaphragm 20 can be suppressed by the thermal deformation of the diaphragm 20 caused by a difference in thermal expansion coefficient between the first and second layers 23 and 24. In other words, the difference in thermal expansion between the layers 23 and 24 can prevent the bottom portion 21 from being shifted toward the opposite side of the member 60 due to the thermal deformation of the diaphragm originated in the shape of the diaphragm 20.

Further, because the diaphragm 20 is simply formed in a cup shape, the diaphragm 20 can be made at a low cost and in a small size. Accordingly, the pressure sensor 100 made in a small size can correctly detect the combustion pressure P at a low cost even when combustion conditions in the chamber 202 are variously changed.

Further, the first layer 23 is disposed so as to extend to the side wall of the diaphragm 20. Therefore, although the first and second layers 23 and 24 differ from each other in thermal expansion coefficient, the attachment of the first layer 23 to the second layer 24 can be reliably maintained even when combustion conditions in the chamber 202 are variously changed.

In this embodiment, the bottom portion 21 of the diaphragm 20 is formed of a lamination of two layers 23 and 24. However, the number of layers in the lamination may be three or more. In this structure, a linear thermal expansion coefficient of each layer disposed nearer to the fixing area K1 than another layer is set to be larger than that of the another layer.

Further, the bottom portion 21 of the diaphragm 20 is formed in a flat shape. However, the bottom portion 21 may be formed in a curved shape so as to place the first layer 23 outside the second layer 24 such that the first function of the diaphragm 20 is maintained.

Embodiment 2

Figure 3:
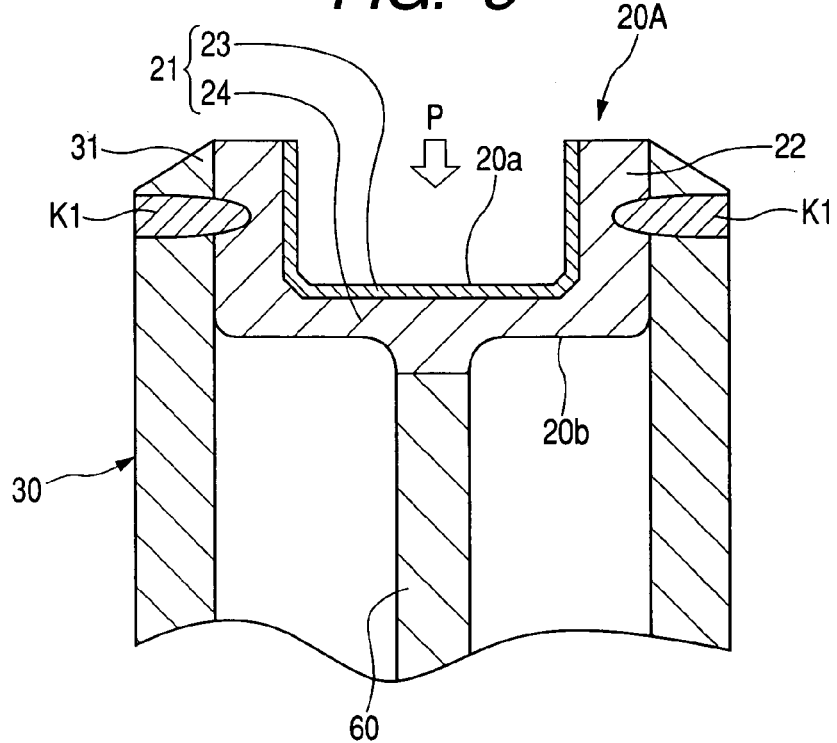
FIG. 3 is an enlarged view of a diaphragm of a pressure sensor according to a second embodiment of the present invention.

FIG. 3 is an enlarged view of a diaphragm attached to the stem 30 according to a second embodiment.

A diaphragm 20A shown in FIG. 3 is attached to the stem 30 of the pressure sensor 100 in the same manner as in the first embodiment. As shown in FIG. 3, the diaphragm 20A is formed in a cup shape opened toward the chamber 202 and has a bottom portion 21 with a flat front surface 20a exposed to the combustion gas. An end portion 22 of the diaphragm 20A is attached to the stem 30 by performing laser welding for the portion 22 and stem 30 along the circumferential direction. Therefore, the portion 22 and the stem 30 are fixed to each other in a fixing area K1.

The diaphragm 20A differs from the diaphragm 20 in that the diaphragm 20A is shaped so as to protrude the bottom portion 21 from the fixing area K1 toward the member 60 (or lower direction in FIG. 3). Therefore, the first layer 23 becomes an inner layer of the diaphragm 20A, and the second layer 24 becomes an outer layer of the diaphragm 20A. All the diaphragm 20A is disposed in an open space of the stem 30. The member 60 is attached to the center of the second layer 24.

Further, the first layer 23 is made of a material having a coefficient $\alpha 1$ of linear thermal expansion (or volume thermal expansion), and the second layer 24 is made of a material having a coefficient $\alpha 2$ of linear thermal expansion (or volume thermal expansion) smaller than the coefficient $\alpha 1$ ($\alpha 1 > \alpha 2$). For example, the first layer 23 is made of 18-8 austenite stainless steel. The second layer 24 is made of a SUS630 type stainless steel, a SUS631 type stainless steel, a SUS430 type stainless steel, Koval, Invar, 42-Alloy, or Molybdenum.

With this structure of the diaphragm 20, a thermal deformation of the diaphragm 20A originated in a shape of the diaphragm 20A is suppressed by a thermal deformation of the diaphragm 20A caused by a difference in thermal expansion between the first and second layers 23 and 24.

More specifically, because the diaphragm 20A is shaped so as to protrude the bottom portion 21 from the fixing area K1 toward the member 60, this shape of the diaphragm 20A induces the bottom portion 21 to be deformed and shifted toward the member 60 so as to be away from the fixing area K1. That is, the diaphragm 20A has a first function of shifting the bottom portion 21 toward the member 60 in the thermal deformation originated in the shape of the diaphragm 20A.

Further, the diaphragm 20A is formed of a lamination of the first and second layers 23 and 24, and the thermal expansion coefficient of the first layer 23 exposed to the gas is set to be larger than that of the second layer 24 attached to the member 60. When a heat of the combustion gas is applied to the diaphragm 20A, the diaphragm 20A acts as a bimetallic element and induces the bottom portion 21 to be deformed and shifted toward the opposite side of the member 60. Therefore, the diaphragm 20A also has a second function of shifting the bottom portion 21 toward the opposite side of the member 60 in the thermal deformation caused by a difference in thermal expansion coefficient between the first and second layers 23 and 24.

Therefore, because the first and second functions of the diaphragm 20A can cancel out each other, the thermal deformation of the bottom portion 21 originated in the shape of the diaphragm 20A can be suppressed by the thermal deformation of the bottom portion 21 caused by a difference in thermal expansion coefficient between the first and second layers 23 and 24. In other words, the difference in thermal expansion between the layers 23 and 24 can prevent the bottom portion 21 from being shifted toward the member 60 due to the thermal deformation of the diaphragm originated in the shape of the diaphragm 20.

Further, because the diaphragm 20A is simply formed in a cup shape, the diaphragm 20A can be made at a low cost and in a small size. Accordingly, the pressure sensor 100 made in a small size can correctly detect the combustion pressure P at a low cost even when combustion conditions in the chamber 202 are variously changed.

Further, because the layer 24 is disposed so as to surround the layer 23 on the side wall of the cup-shaped diaphragm 20, the attachment of the first layer 23 to the second layer 24 can be reliably maintained even when combustion conditions in the chamber 202 are variously changed.

The number of layers in the bottom portion 21 of the diaphragm 20 may be three or more. In this structure, a linear thermal expansion coefficient of each layer disposed nearer to the fixing area K1 than another layer is set to be smaller than that of the another layer.

Further, the bottom portion 21 of the diaphragm 20A is formed in a flat shape. However, the bottom portion 21 may be curved. For example, the bottom portion 21 may be formed in a curved shape so as to place the second layer 24 outside the first layer 23 such that the first function of the diaphragm 20A is maintained.

Embodiment 3

The layers 23 and 24 according to the first embodiment are attached to each other as a lamination by rolling. However, the attachment between the layers 23 and 24 is not limited to the rolling process.

Figure 4:
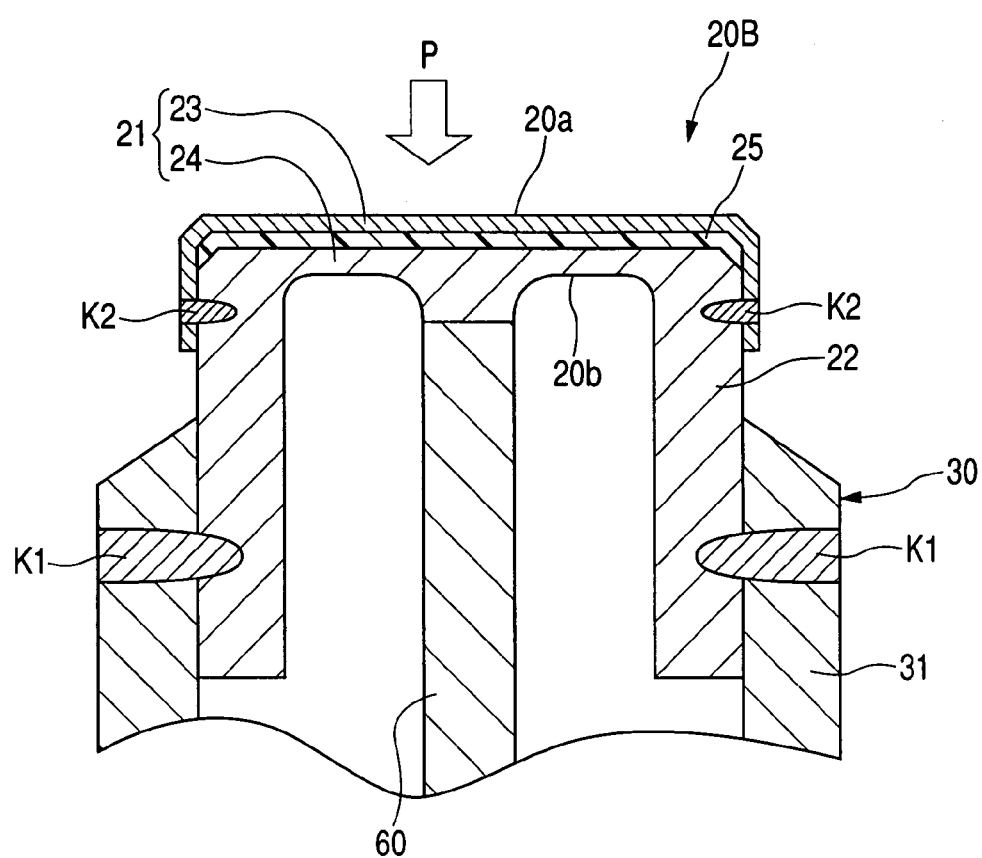
FIG. 4 is an enlarged view of a diaphragm of a pressure sensor according to a third embodiment of the present invention.

FIG. 4 is an enlarged view of a diaphragm attached to the stem 30 according to a third embodiment.

A diaphragm 20B shown in FIG. 4 is attached to the stem 30 of the pressure sensor 100 in the same manner as in the first embodiment. As shown in FIG. 4, in the same manner as in the first embodiment, the diaphragm 20B is formed in a cup shape and has the bottom portion 21 with the front surface 20a. The diaphragm 20C differs from the diaphragm 20 shown in FIG. 2 in that the layers 23 and 24 are attached to each other by an adhesive agent such as polyimide resin so as to face each other through an adhesive layer 25. The layers 23 and 24 are fixed to each other in a fixing area K2 by laser welding performed for the layers 23 and 24 along the circumferential direction of the stem 30. The adhesive layer 25 is surrounded by the fixing area K2.

In the manufacturing of the diaphragm 20B, the layers 23 and 24 are first attached to each other by the adhesive agent, and a circumferential area of the layers 23 and 24 are laser-welded. Then, end portions of the layers 23 and 24 are bent, and the most end portion 22 of the layer 24 is inserted into the open space of the stem 30. Then, the portion 22 is fixed to the stem 30 by laser welding.

Accordingly, in the same manner as in the first embodiment, the pressure sensor 100 with the diaphragm 20B made in a small size and at a low cost can correctly detect the combustion pressure P even when combustion conditions in the chamber 202 are variously changed.

Further, the attachment between the layers 23 and 24 can be reliably maintained due to the layer 25 and the laser welding, regardless of a difference in thermal expansion coefficient between the layers 23 and 24.

The attachment between the layers 23 and 24 through the layer 25 can be applied for the diaphragm 20A shown in FIG. 3.

MODIFICATIONS

The layers 23 and 24 may be attached to each other by brazing while using brazing filler metal generally used. Further, the layers 23 and 24 may be attached to each other by the friction welding, ultrasonic welding or the like.

The housing 40 and the stem 30 in the base portion 15 are attached to each other in these embodiments. However, the base portion 15 may be integrally formed to fixedly support the diaphragm 20, 20A or 20B.

In these embodiments, the diaphragms 20, 20A and 20B are applied for the pressure sensor 100 for detecting a combustion pressure in the chamber 202 of the engine. However, the combination of the diaphragm 20, 20A or 20B, the member 60 and the element 50 disposed in the case portion 10 may be applied for any type of pressure sensor for detecting a pressure of gas or liquid.

What is claimed is:

1. A pressure sensor comprising:
a diaphragm which is deformable in response to a pressure applied on a front surface of the diaphragm;
a pressure transmitting member which receives the pressure from the diaphragm in response to a deformation of the diaphragm; and
a sensing element which detects the pressure transmitted from the pressure transmitting member, wherein
the diaphragm has a first layer with the front surface and a second layer, the pressure transmitting member receives the pressure from the second layer of the diaphragm in response to the deformation of the diaphragm, and a thermal expansion coefficient of the second layer is larger than a thermal expansion coefficient of the first layer, and wherein
the diaphragm has a shape so as to shift the second layer of the diaphragm toward a side opposite to the pressure transmitting member in response to a heat applied to the diaphragm.

2. The pressure sensor according to claim 1, wherein the second layer is made of a 18-8 stainless steel containing 0.08% Carbon or less, 1.00% Silicon or less, 2.00% Manganese or less, 0.045% Phosphorus or less, 0.030% Sulfur or less, 8.00% to 10.50% Nickel, 18.00% to 20.00% Chromium, and the balance substantially all iron.

3. The pressure sensor according to claim 1, wherein a material of the first layer is selected from the group consisting of a SUS630 type stainless steel containing 17% Chromium, 4% Nickel, 4% Copper, Niobium slightly, and the balance substantially all iron, a SUS631 type stainless steel containing 17% Chromium, 7% Nickel, 1% Aluminum, and the balance substantially all iron, and a SUS430 type stainless steel containing 18% Chromium and the balance substantially all iron.

4. The pressure sensor according to claim 1, wherein a material of the first layer is selected from the group consisting of Koval containing 29% Nickel, 17% Cobalt, and the balance substantially all iron, Invar containing 36% Nickel, and the balance substantially all iron, 42-Alloy containing 42% Nickel and the balance substantially all iron, and Molybdenum.

5. A pressure sensor comprising:
a diaphragm which is deformable in response to a pressure applied on a front surface of the diaphragm;
a pressure transmitting member which receives the pressure from the diaphragm in response to a deformation of the diaphragm; and
a sensing element which detects the pressure transmitted from the pressure transmitting member,
wherein the diaphragm has a first layer with the front surface and a second layer, the pressure transmitting member receives the pressure from the second layer of the diaphragm in response to the deformation of the diaphragm, and a thermal expansion coefficient of the first layer is larger than a thermal expansion coefficient of the second layer,
and wherein the diaphragm has a shape so as to shift the second layer of the diaphragm toward the pressure transmitting member in response to a heat applied to the diaphragm.

6. The pressure sensor according to claim 5, wherein the first layer is made of a 18-8 stainless steel containing 0.08% Carbon or less, 1.00% Silicon or less, 2.00% Manganese or less, 0.045% Phosphorus or less, 0.030% Sulfur or less, 8.00% to 10.50% Nickel, 18.00% to 20.00% Chromium, and the balance substantially all iron.

7. The pressure sensor according to claim 5, wherein a material of the second layer is selected from the group consisting of a SUS630 type stainless steel containing 17% Chromium, 4% Nickel, 4% Copper, Niobium slightly, and the balance substantially all iron, a SUS631 type stainless steel containing 17% Chromium, 7% Nickel, 1% Aluminum, and the balance substantially all iron, and a SUS430 type stainless steel containing 18% Chromium and the balance substantially all iron.

8. The pressure sensor according to claim 5, wherein a material of the second layer is selected from the group consisting of Koval containing 29% Nickel, 17% Cobalt, and the balance substantially all iron, Invar containing 36% Nickel, and the balance substantially all iron, 42-Alloy containing 42% Nickel and the balance substantially all iron, and Molybdenum.

9. The pressure sensor according to claim 1, wherein the first and second layers of the diaphragm are configured to be attached to each other by rolling.

10. The pressure sensor according to claim 1, wherein the first and second layers of the diaphragm are configured to be attached to each other by brazing.

11. The pressure sensor according to claim 1, wherein outer portions of the first and second layers of the diaphragm are configured to be attached to each other by welding, and inner portions of the first and second layers surrounded by the outer portions are configured to be attached to each other by an adhesive agent.

12. The pressure sensor according to claim 1, wherein the first and second layers of the diaphragm are configured to be attached to each other by friction welding.

13. The pressure sensor according to claim 1, wherein the first and second layers of the diaphragm are configured to be attached to each other by ultrasonic welding.

14. The pressure sensor according to claim 1, wherein the first surface of the diaphragm is configured to be exposed to a combustion gas of a combustion chamber of an engine, and the first and second layers of the diaphragm is configured to receive a combustion pressure of the gas.

15. A pressure sensor comprising:
a diaphragm which is deformable in response to a pressure applied on a front surface of the diaphragm;
a deformation transmitting member being in contact with the diaphragm;
a sensing element which receives a deformation of the diaphragm through the deformation transmitting member and detects the pressure from the deformation; and
a base portion to which the diaphragm is fixed at a fixing position, wherein
the diaphragm has a first layer with the front surface and a second layer, the deformation transmitting member receives the deformation from the second layer of the diaphragm in response to the deformation of the diaphragm, and the first and second layers of the diaphragm have thermal expansion coefficients differing from each other so as to reduce a thermal deformation of the diaphragm originated in a shape of the diaphragm, and wherein
the diaphragm is shaped such that the first and second layers of the diaphragm are protruded from the fixing position toward a side opposite to the deformation transmitting member, and the thermal expansion coeffient of the second layer is set to be larger that that of the first layer so as to prevent the second layer of the diaphragm from being shifted toward the side opposite to the pressure transmitting member due to the thermal deformation of the diaphragm originated in the shape of the diaphragm.

16. The pressure sensor according to claim 15, wherein the first and second layers has a flat shape or a curved shape so as to place the first layer outside the second layer.

17. A pressure sensor comprising:
a diaphragm which is deformable in response to a pressure applied on a front surface of the diaphragm;
a deformation transmitting member being in contact with the diaphragm;
a sensing element which receives a deformation of the diaphragm through the deformation transmitting member and detects the pressure from the deformatiom; and
a base portion to which the diaphragm is fixed at a fixing position, wherein
the diaphragm has a first layer with the front surface and a second layer, the deformation transmitting member receives the deformation from the second layer of the diaphragm in response to the deformation of the diaphragm, and the first and second layers of the diaphragm have thermal expansion coefficients differing from each other so as to reduce a thermal deformation of the diaphragm originated in a shape of the diaphragm, and wherein
the diaphragm is shaped such that the first and second layers of the diaphragm are protruded from the fixing position toward the deformation transmitting member, and the thermal expansion coefficient of the first layer is set to be larger than that of the second layer so as to prevent the second layer of the diaphragm from being shifted toward the pressure transmitting member due to the thermal deformation of the diaphragm originated in the shape of the diaphragm.

18. The pressure sensor according to claim 17, wherein the first and second layers has a flat shape or a curved shape so as to place the second layer outside the first layer.

* * * * *